3,495,986
SILVER HALIDE EMULSION CONTAINING AN AQUEOUS LATEX PREPARED WITH A COUPLER HAVING SURFACTANT PROPERTIES
Simone Franco, Casalgrasso, Cuneo, and Guido Polla-Mattiot, Ferrania, Savona, Italy, assignors to Ferrania S.p.A., Milan, Italy
No Drawing. Filed Feb. 21, 1966, Ser. No. 528,812
Claims priority, application Italy, Feb. 23, 1965, 3,685/65
Int. Cl. G03c 5/54, 1/72, 1/40
U.S. Cl. 96—100    10 Claims

ABSTRACT OF THE DISCLOSURE

Aqueous polymer latices suitable for use in photographic emulsions are prepared using as a sole dispersing agent, a coupler compound having surfactant properties, thereby avoiding desensitization, migration, and viscosity problems associated with photographic emulsions containing small amounts of common dispersing agents.

---

The present invention relates to a process for the preparation of improved emulsions for color photography.

Many emulsion materials normally used for the preparation of photographic films, particularly gelatin, tend to become brittle, especially at lower temperatures. When photographically active materials, such as couplers, filter dyes, hardeners and the like, are added to the emulsions, as is conventional in the preparation of photographic emulsions for color photography, brittleness can become a serious problem. Attempts have been made to reduce or eliminate brittleness with varying degrees of success. One method which has been used involves the incorporation of a polymeric hydrosol or latex into the photographic emulsion. This has made it possible both to reduce the brittleness of photosensitive layers and also to improve other physical characteristics, e.g. reducing curl, abrasion susceptibility, swelling, drying rate, etc. Suitable hydrosols, latices or aqueous polymeric dispersions are normally prepared by emulsion polymerization, i.e. by dispersing the monomer or monomers in water with a dispersing agent or surfactant, such as sodium lauryl sulfate, sodium oleate, cetyltrimethylammonium chloride, etc., and by polymerizing the reaction mixture in the presence of a water soluble initiator (generally a peroxy compound, such as ammonium or potassium persulfate, hydrogen peroxide, sodium perborate, etc.; or a redox system such as persulfate-bisulfite; or an azo initiator system such as alpha,alpha'-azo-bis-isobutyramidine hydrochloride or 4,4'-azo-bis-4-cyanopentanoic acid, etc.). Illustrative polymerization techniques are fully described in the patent literature, e.g. see U.S. 2,739,137; British Patent No. 759,409; U.S. 2,599,300; and U.S. 2,852,386. Hydrosols or latices prepared in this manner retain the dispersing agent or surfactant, which is eventually incorporated into the photographic emulsion, where it tends to adversely affect the properties of the photosensitive layer. For example, anionic and cationic dispersing agents often reduce the desired sensitometric properties, and anionic dispersing agents of the lauryl sulfate type produce an undesirable increase in the emulsion viscosity. The presence of such surfactants can also modify the rheological properties of the emulsion because of their effect on the surface tension, causing difficulties in spreading and coating, particularly in the manufacture of multilayer photographic constructions.

It is accordingly an object of this invention to provide polymeric dispersions or latices which can be incorporated into a photographic emulsion to reduce brittleness and otherwise improve the properties of a photographic film prepared therefrom without the undesirable effects normally associated with the presence of surfactants and dispersing agents conventionally present in such polymeric dispersions or latices.

In the preparation of photographic emulsions for color photography it is conventional to add color couplers to the photosensitive emulsion, such couplers being capable of reacting with the oxidation products of primary aromatic amines to form a dye. In order to insure improved color reproduction, particularly in the intermediate layers of a multi-layer film construction, couplers may be used which are capable of reacting with the oxidation products of the chromogenic developer to yield colorless reaction products (e.g. see French Patent Nos. 1,183,746 and 1,340,552 and British Patent No. 914,145). All of these couplers normally contain, in addition to the coupling group, diffusion-inhibiting chains (mostly fatty chains) and solubilizing groups, such as carboxyl, sulfonic acid, quaternary ammonium salts, groups containing recurring oxyethylene units, etc. It has now been found that couplers having surfactant properties can also be usefully employed as the emulsifying or dispersing agent in the emulsion polymerization of ethylenically unsaturated monomers in place of a portion of or, preferably, all of the conventional surfactants heretofore employed. These couplers are at least partially water soluble and are preferably resistant to diffusion in a gelatin film. Their use as the surfactants in free radical initiated polymerization reactions requires substantially no change in the conventional procedures normally employed for such polymerization, and the monomers to be polymerized may be conveniently added with vigorous stirring to an aqueous solution of the coupler, the free radical producing initiator added and the polymerization reaction carried out at a suitable elevated temperature for the monomers used. The properties of the photographic emulsions including such polymers are generally improved without the loss in sensitometric and rheological properties which normally occurs when conventional polymeric dispersion and latices are incorporated into photographic emulsions.

Besides what was said before this process permits to avoid the "incompatibility" draw-backs which may arise when polymeric dispersions prepared with conventional ionic dispersing agents are used in preparing photographic emulsions.

Particularly, using latices obtained with cationic dispersing agents in photographic emulsions with couplers containing in their molecule acid water solubilizing groups (carboxyl, sulfonic acid) implies difficulties in obtaining transparent photographic layers because of the interaction between the coupler and the dispersing agent with consequent flocculation, at least in part, in the photographic layer of the coupler and the latex.

Another advantage associated with the practice of the present invention is the relatively small increase in viscosity observed when the couplers are utilized as dispersants in the preparation of the polymeric latex. Although the mechanism is not fully understood, it is believed that the couplers are concentrated on the surface of the polymeric particles and therefore are less capable of interreacting with the gelatin to increase its viscosity.

As stated earlier, the process of preparing suitable polymeric latices using couplers as dispersing agents is not confined to a particular type of polymeric latex, and any suitable polymer which is compatible with the gelatin emulsion can be used, including both homopolymers and copolymers. Preferably polymerizable, ethylenically unsaturated monomers are empolyed, including acrylate and methacrylate esters such as etheyl acrylate, n-butyl acrylate, 2-ethylhexyl acrylate, ethylbutyl methacrylate and the like; the substituted or unsubstituted acrylamides such as N-butylmethacrylamide, N,N'-dibutylacrylamide, N-octylacrylamide, etc.; vinyl esters such as vinyl acetate, vinyl butyrate, etc.; conjugated dienes, such as butadiene, isoprene, dimethylbutadiene, chloroprene, fluoroprene, etc.; aromatic compounds, particularly those of the vinylbenzene type, such as styrene, vinyltoluene, etc.; vinyl halides such as vinyl chloride, vinylidene halides such as vinylidene chloride; acrylonitrile; methacrylonitrile; vinylpyridines, vinylquinolines; etc. Frequently it is desirable to include in the polymerization mixture small amounts of hydrophilic monomers, such as acrylic and methacrylic acids, acrylamide, N-methylacrylamide, methacrylamide, vinylpyrrolidone, vinyloxazolidone, potassium styrene sulfonate, and the like. In some cases difunctional monomers may also be used for providing crosslinked polymers, and representative crosslinking agents include ethylene glycol dimethacrylate, methylene-bis-acrylamide, divinylbenzene, etc.

The suitable couplers have surfactant properties and contain at least one water solubilizing group and a diffusion-inhibiting moiety. Typical diffusion-inhibiting moieties, known in the photographic art to reduce the diffusion of the couplers in photographic layers, include linear or branched fatty chains having from 5 to 20 carbon atoms, e.g. lauryl, palmitoyl, stearyl oleyl octyl decyl and the like residues or polyoxyethylene or polyoxypropylene chains. Suitable water solubilizing groups include carboxylic or sulfonic acid groups and the salts thereof (preferably alkali metal or ammonium salts), quaternary ammonium salts and polyoxyethylene moieties. The water solubility of the couplers can vary greatly depending on the type and number of solubilizing groups and on the type and the size of the diffusion-inhibiting moiety. Although couplers which are soluble in an aqueous medium under neutral conditions are normally employed, solutions of couplers having a pH in the acidic or alkyline ranges can be used. The coupler surfactants need not be soluble to any great extent in the polymerization medium, and concentrations of as low as 0.1 weight percent or less of a slightly soluble coupler surfactant can be used.

The amount of hydrosol or latex to be added to the photographic emulsion can vary within wide limits, depending on the type of polymer and on the results desired. As a rule the polymer is used in amounts of from 5 to 95 weight percent (based on dry polymer solids) of the gelatin. In general the variation in the physical properties of the photosensitive emulsion layer is directly proportional to the amount of hydrosol or latex which is added.

The amount of coupler employed as dispersing agent during the polymerization may not be sufficient for the preparation of the photographic emulsion, and it may be desirable to add additional coupler to the emulsion before preparing the photosensitive layer in the normal manner.

The following examples will serve to illustrate the invention without in any way limiting its scope.

EXAMPLE 1

To 100 ml. of an aqueous solution (pH of 7.6) containing 5 g. of the coupler.

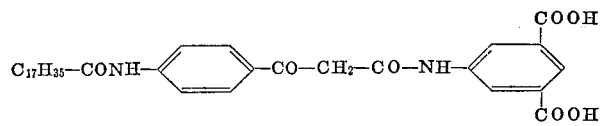

were added at 50° C. 1.5 ml. of a 5% aqueous solution of ammonium persulfate and, dropwise with efficient stirring, 20 ml. of carefully distilled n-butyl acrylate. The dispersion thus obtained was then gradually heated to 90° C., maintained at that temperature for 30 minutes with good stirring, then cooled and filtered.

A poly-n-butyl acrylate hydrosol was obtained in a conversion of about 95% of the theory.

EXAMPLE 2

To 100 ml. of an aqueous solution having a pH of 7 and containing 5 g. of the coupler

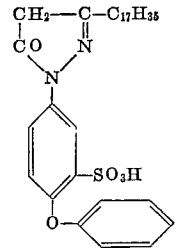

were added at room temperature 2.5 ml. of a 1% alcoholic solution of 4,4'-azo-bis-4-cyanopentanoic acid and, dropwise with efficient stirring, 20 ml. of carefully purified ethyl acrylate. Following the same procedure as in Example 1, a poly-ethyl acrylate hydrosol was obtained.

EXAMPLE 3

By proceeding as in Example 1, but employing 100 ml. of a 5% aqueous solution (pH of 7.8) of the coupler

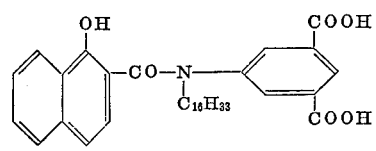

a poly-n-butyl acrylate hydrosol was obtained with a conversion of about 95% of the theory.

EXAMPLE 4

To 200 ml. of a 5% solution (pH of 7.6) of the coupler of the Example 1, were added 15 ml. of a 5% aqueous solution of ammonium persulfate and 100 ml. of distilled isoprene. The mixture was then heated in autoclave at 85° C. for 8 hours with efficient stirring.

Finally, the resulting dispersion was maintained at 50° C. under reduced pressure to remove all unreacted monomer, while simultaneously concentrating the latex. An aqueous dispersion containing about 25% of polyisoprene was obtained.

EXAMPLE 5

To 25 ml. of a 5% aqueous solution (pH of 7.6) of the coupler

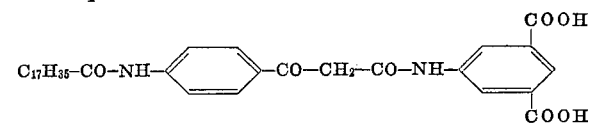

were added 75 ml. of H₂O, 1.5 ml. of 5% ammonium persulfate and 20 ml. of ethyl acrylate. Following the same polymerization procedures as in Example 1, a poly-ethyl acrylate hydrosol was obtained.

EXAMPLE 6

The procedure of Example 5 was followed, employing 25 ml. of styrene in place of the ethyl acrylate. A polystyrene hydrosol was obtained.

EXAMPLE 7

To 100 ml. of a 4% solution of the coupler

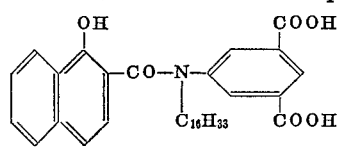

(adjusted to pH 10) were added under vigorous stirring, 3 ml. of 5% ammonium persulfate in H₂O and 25 ml. of styrene monomer. The mixture was then brought to

EXAMPLE 8

The procedure was the same as in the Example 2, but utilizing 20 ml. of N,N-dibutylacrylamide in place of the ethyl acrylate. A homopolymer of the dibutyl acrylamide was obtained in the form of a hydrosol.

EXAMPLE 9

The procedure was the same as in the Example 2, but utilizing 20 ml. of 2-ethylhexyl acrylate and 1.5 ml. of a 1% ethanolic solution of 4,4′-azo-bis-4-cyanopentanoic acid in place of the persulfate. A poly-2-ethylhexyl acrylate hydrosol was obtained.

EXAMPLE 10

The procedure was the same as in the Example 5, but utilizing 15 ml. of n-octyl acrylate and 5 ml. of vinyl acetate. A hydrosol of n-octyl acrylate-vinyl acetate copolymer was obtained.

EXAMPLE 11

The procedure was the same as in the Example 10, but utilizing 15 ml, of 2-ethylhexyl acrylate and 5 ml. of vinyl acetate to produce a copolymer in hydrosol form.

EXAMPLE 12

The procedure was the same as in the Example 10, but

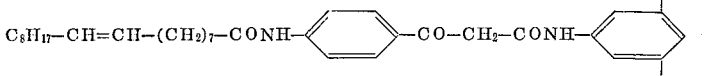

utilizing 20 ml. of vinyl acetate to produce a polymeric hydrosol.

EXAMPLE 13

The process was carried out as in the Example 5 but employing 18 ml. of n-butyl acrylate and 2 ml. of divinyl benzene to produce a copolymer in hydrosol form.

EXAMPLE 14

The procedure was the same as in the Example 5, but utilizing 17 ml. of ethyl acrylate and 3 ml. of N-vinyl-2-oxazolidone to produce the copolymer in hydrosol form.

EXAMPLE 15

The procedure was the same as in the Example 2, but utilizing 100 ml. of a 2.5% aqueous solution (pH of 7.6) of the coupler.

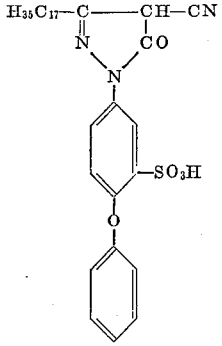

A polymer of ethyl acrylate was obtained in the form of a hydrosol.

EXAMPLE 16

The procedure was the same as in the Example 3 but utilizing 100 ml. of a 2.5% solution (pH of 7.8) of the coupler

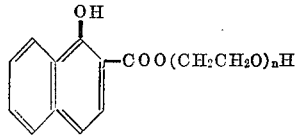

where $n$ is about 15–20. A hydrosol of poly-n-butyl acrylate was obtained.

EXAMPLE 17

The process was carried out as in the Example 2 but utilizing 100 ml. of a 2.5% solution having a pH of 7.8 of the coupler

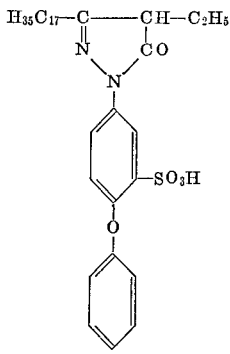

to produce a hydrosol of polyethyl acrylate.

EXAMPLE 18

The procedure was the same as in the Example 1, but utilizing 100 ml. of a 1% aqueous solution having a pH of 7.4 of the coupler

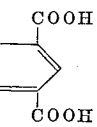

to produce a latex of poly-n-butyl acrylate. In this and all preceding examples polymeric latices of excellent properties were obtained.

EXAMPLE 19

(a) To a positive type emulsion having 8.8% by weight silver halide-gelatin and a Ag/gelatin weight ratio of 0.29, was added the coupler of the formula:

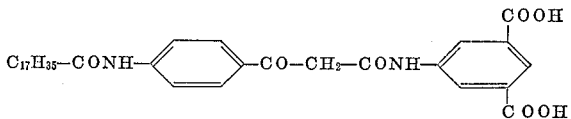

in such an amount as to have a coupler/gelatin final weight ratio of 22.5/100.

Thereafter, the usual aids were added, and the emulsion was spread on a support of cellulose triacetate so as to obtain a dry film having a thickness of about 10 microns.

After aging for 8 days the material was developed in the usual manner. After conditioning of the material at 20% of relative humidity for 22 hours, the brittleness was determined with the Wedge Brittleness Tester described by Adelstein in Photographic Science and Engineering, 1, 63 (1957).

The following results were obtained:

Emulsion cracks _____ 30
Complete film breaks _____ 19
Percent of non-rupture _____ 0

(b) A positive type emulsion having 8.8% by weight silver halide-gelatin and a Ag/gelatin weight ratio of 0.29 was divided into 5 sample portions which were treated as follows:

(1) To the first one the latex prepared as reported in Example 1 was added in such an amount as to obtain a polymer/gelatin ratio of 20/100;

(2) To the second one the latex prepared as reported in Example 1 was added in an amount providing a polymer/gelatin ratio of 40/100;

(3) To the third one the latex prepared as reported in Example 1 was added in an amount providing a polymer/gelatin ratio of 70/100;

(4) To the fourth one the latex prepared as reported in Example 4 was added in an amount providing a polymer/gelatin ratio of 20/100;

(5) To the fifth one the latex prepared in Example 4 was added in an amount providing a polymer/gelatin ratio of 40/100.

To each portion was then added the same coupler as in part (a) in an amount providing a coupled/gelatin final ratio of 22.5/100.

The procedure of part (a) was then followed, and the brittleness was determined.

The following results were obtained:

|  | Emulsion cracks | Complete film breaks | Percent of nonrupture |
|---|---|---|---|
| 1st sample | 23 | 16 | 0 |
| 2d sample | 12 | 10 | 10 |
| 3d sample | 4 | 4 | 100 |
| 4th sample | 15 | 13 | 0 |
| 5th sample | 6 | 5 | 70 |

EXAMPLE 20

A positive type emulsion having 8.8% by weight silver halide-gelatin and having an Ag/gelatin ratio of 0.29 was divided into 3 portions which were treated as follows:

(a) To the first portion was added a solution of the coupler of the formula:

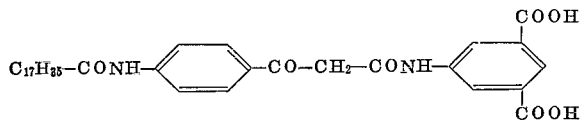

in such an amount as to provide a coupler/gelatin final ratio of 22.5/100;

(b) To the second portion was added latex prepared as reported in the Example 1 in an amount providing a polymer/gelatin ratio of 40/100. Then a solution of the coupler reported in part (a) of this example was added in an amount sufficient to obtain a coupler/gelatin final ratio of 22.5/100;

(c) To the third portion was added latex prepared as reported in the Example 1, except for the use of 100 ml. of 5% aqueous sodium lauryl sulfate solution as the sole dispersing agent, in an amount sufficient to provide a polymer/gelatin ratio of 40/100. Then a solution of the coupler reported in part (a) was added in an amount sufficient to provide a coupler/gelatin final ratio of 22.5/100.

After adjustment of the pH to a value of 5.8–6.0, the usual aids were added to the three emulsions and brought to equal volume with $H_2O$.

The following viscosity values are obtained at the spread.

Run: Viscosity (in cps. at 40° C.)
a _____ 18.8
b _____ 15.8
c _____ 29

EXAMPLE 21

A positive type emulsion having 8.8% by weight silver halide-gelatin and having a Ag/gelatin ratio of 0.29 was divided into two portions which were treated as follows:

(a) To the first one was added a solution of the cupler of the formula

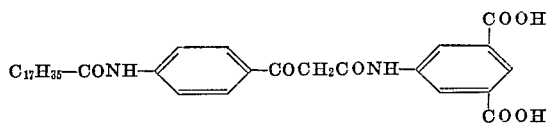

in such an amount as to have a coupler/gelatin final weight ratio of 22.5/100.

(b) To the second portion was added an amount of the latex prepared as reported in Example 5 sufficient to give a polymer/gelatin ratio of 40/100. Then a solution of the coupler of part (a) was added in an amount sufficient to provide a coupler/gelatin final weight ratio of 22.5/100. After adjustment of the pH to the value of 6.0–6.2 the two emulsions were treated with suitable amounts of the usual aids and then coated onto a support of cellulose triacetate to produce a film having a dry thickness of about 10 microns.

After ageing for 10 days the material was conditioned at 20% relative humidity for 22 hours. Then the brittleness was determined by means of the Wedge Brittleness Tester, and the following results were obtained:

| Run | Emulsion crakes | Complete film breaks | Percent of nonrupture |
|---|---|---|---|
| a | >35 | 10 | 0 |
| b | 24 | 8 | 0 |

EXAMPLE 22

A positive type gelatino-silver halide emulsion having 8.8% solids by weight in water and having a silver/gelatin ratio of 0.29, was divided into three equal portions.

(a) To the first portion was added polymer latex prepared as described in Example 2. Sufficient latex was added to provide a polymer/gelatin ratio of 30/100. Then an additional quantity of the color coupler solution of Example 2 was added to provide a coupler/gelatin ratio of 13/100.

(b) To the second portion was added polymer latex prepared as described in Example 2, except for the use of 100 ml. of a 5% aqueous solution of cetyl-trimethyl-ammonium chloride as dispersing agent instead of the coupler solution. Sufficient latex was added to provide a polymer/gelatin ratio of 30/100. Then the color coupler solution of Example 2 was added to provide a coupler/gelatin ratio of 13/100.

(c) To the third portion was added polymer latex prepared as described in Example 2, except for the use of 100 ml. of a 5% aqueous solution of polyoxyethylene-glycol-monolauryl-ether having the general formula $HO-CH_2CH_2(CH_2CH_2O)_n-CH_2CH_2OC_{12}H_{25}$ wherein $n$ is 15 to 20, as dispersing agent instead of the coupler solution. Sufficient latex was added to provide a polymer/gelatin ratio of 30/100. Then the color coupler solution of Example 2 was added to provide a coupler/gelatin ratio of 13/100.

After adjusting the pH to 5.6–5.8 the three emulsions were coated in conventional manner onto a cellulose triacetate film base, the coating having about 7 microns dry thickness. After 5 days storage at 50° C. and 65% relative humidity the three samples were exposed through a 0.15 log E wedge and then developed, bleached, washed and dried in the conventional manner for obtaining a color image by color development. The speed was measured using light of a complementary color (i.e. green) at a density of 0.1 over fog. The numerical values given in the table are expressed as log E differences, referring to a particular point on the wedge as zero. The positive values indicate greater speed.

| Test | Fog | Speed | Contrast | Maximum density (in complementary light) |
|---|---|---|---|---|
| (a) | 0.16 | +0.15 | 2.5 | 2.12 |
| (b)* | 0.28 | +0.10 | 0.8 | 1.13 |
| (c) | 0.52 | −0.40 | 1.3 | 1.41 |

*Sample (b) showed some opalescence in the photosensitive layer due to partial flocculation of the polymer with the color coupler.

By "percent of non-rupture" we mean the percent of samples which pass through the narrowest part of the wedge (0.06 inch) without failure and to which an arbitrary value of 4 (expressed in inch/100), is assigned (see Adelstein, of reference).

The brittleness units are expressed in inch/100 instead of inches.

The embodiments of the invention in which an exclusive property or privilege is claimed are defined as follows:

1. In the process of preparing an aqueous polymer latex from ethylenically unsaturated monomers, said polymer latex being of type suitable for use in photographic emulsion formulation, the improvement which comprises using a coupler capable of forming a reaction product with an oxidation product of a primary aromatic amine photographic developer and having surfactant properties as the sole dispersing agent during the polymerization process.

2. The process of claim 1 in which said reaction product is a dyestuff.

3. The process of claim 1 in which said reaction product is colorless.

4. The process of claim 1 in which said coupler is of the non-diffusing type.

5. The process of claim 1 in which said polymerization process is free radical initiated.

6. The process of claim 5 in which said process employs a peroxide free radical initiator.

7. A silver halide photographic emulsion having an aqueous latex of a synthetic polymer suitable for use in the formulation of photographic emulsion for color photography, said latex being prepared from ethylenically unsaturated monomers by employment, as the sole dispersing agent during polymerization, of a coupler having surfactant properties and capable of forming a reaction product with an oxidation product of a primary aromatic amine photographic developer.

8. The emulsion of claim 7 in which said coupler is of the non-diffusing type.

9. The emulsion of claim 7 wherein said coupler is the sole coupler in said emulsion.

10. In the process of preparing a silver halide photographic emulsion having an aqueous latex of a synthetic polymer prepared from ethylenically unsaturated monomers, said polymer being suitable for use in photographic emulsions for color photography, the improvement which comprises employing, as the sole dispersing agent during polymerization of said latex, a coupler having surfactant properties and capable of forming a reaction product with an oxidation product of a primary aromatic amine photographic developer.

References Cited

UNITED STATES PATENTS

| 3,142,568 | 7/1964 | Nottorf | 96—114 |
| 2,835,582 | 5/1958 | Fowler et al. | |

FOREIGN PATENTS 1,340,552   9/1963   France.

NORMAN G. TORCHIN, Primary Examiner

ROBERT LYONS, Assistant Examiner

U.S. Cl. X.R.

96—29, 114; 260—29.6